United States Patent [19]

Henault

[11] Patent Number: 5,020,325
[45] Date of Patent: Jun. 4, 1991

[54] HEAT MOTOR

[75] Inventor: Claude Henault, Arpajon Cedex, France

[73] Assignee: Procedes Vernet, Arpajon Cedex, France

[21] Appl. No.: 479,160

[22] Filed: Feb. 13, 1990

[51] Int. Cl.⁵ ............................................... F03G 7/06
[52] U.S. Cl. .......................................... 60/528; 60/527
[58] Field of Search ................................... 60/527, 528

[56] References Cited

U.S. PATENT DOCUMENTS

| | | | |
|---|---|---|---|
| 3,430,440 | 3/1969 | Pouliot | 60/530 |
| 3,500,634 | 3/1970 | Waseleski, Jr. et al. | 60/528 |
| 3,696,611 | 10/1972 | Noakes et al. | 60/23 |
| 3,860,169 | 1/1975 | Norman | 236/68 |
| 4,685,651 | 8/1987 | Nouvelle et al. | 251/11 |

*Primary Examiner*—Allen M. Ostrager
*Attorney, Agent, or Firm*—Lane, Aitken & McCann

[57] ABSTRACT

A heat motor includes a chamber containing a thermally expansible material and an electrical heating element within the expansible material, wherein the expansible material is interposed between all significant surfaces of the electrical heating element and walls of the heat motor defining the chamber. Electrical leads for the electrical heating element extend out of the chamber through a glass plug mounted in a bottom wall of the heat motor. The bottom wall is connected to a side wall of the heat motor by crimping the side wall under the bottom wall to form a flange and to compress an elastomeric seal between the bottom wall and a shoulder of the heat body above the bottom wall. In one embodiment, the electrical heating element includes electrically conducting plates which receive the electrical leads in a plug-in connection. The electric resistance element is a thermistor having a positive temperature coefficient or a thin film resistor having a resistance film substantially covering two opposite sides to maximize heat transfer area.

17 Claims, 1 Drawing Sheet

HEAT MOTOR

BACKGROUND OF THE INVENTION

The present invention relates to heat motors and, more particularly, to motors which operate by the expansion of a contained material in response to an increase in the temperature of the material.

Heat motors containing a thermally expansible material, such as a wax, to extend a piston and thereby do work have long been known. Such motors have commonly been used in connection with vehicle thermostats to control the flow of cooling system liquid in the vehicle engine in response to the temperature of the cooling system liquid. In most cases, heat is imparted to the expansible material by the cooling system liquid flowing around the heat motor. It has also been known to actuate heat motors by wrapping an electric resistance heating element around a housing containing the thermally expansible material and to supply a current to the heating element in response to a certain predetermined condition. A significant problem with heat motors of the latter type is that heat must be transferred from the electric resistance heating element to the thermally expansible material through the cup containing the material and through insulation around the heating element. Thus, the response of the heat motor to the predetermined condition is slow.

It has also been proposed to place the electric heating element inside the wax to improve the response time of the heat motor. This arrangement has had the drawback that the heating element scorches the thermally expansible material and destroys its thermal expansion characteristics. In addition, expansion of the thermally expansible material during heating exerts strong forces on the electric heating element tending to push the heating element against a wall of the heat motor, damaging the element. There has also been a problem with leakage of the expansible material from the cup where electrical leads for the heating element have extended through the wall of the cup. Furthermore, the arrangement of the electric heating element in the cup has caused overstroking of the piston. The overstroking has been controlled by the use of a regulator connected in a circuit with the heating element. However, the requirement for an additional control device to be mounted and to take up space wherever a heat motor is used is unacceptable in many applications.

It has also been proposed to employ a thermistor having a positive temperature coefficient as a heating element for a heat motor in order to avoid overheating of the expansible material without using a separate regulator, since such thermistors are self-regulating in that their resistance increases as their temperature increases. The increased resistance reduces the current through the thermistor and thereby limits the temperature of the thermistor and the amount of heat it transfers to the expansible material. U.S. Pat. No. 3,696,611 to Noakes et al. discloses a thermistor provided as a sleeve around the outside of a thermal motor. U.S. Pat. No. 3,860,169 to Norman discloses a thermistor held in contact with the outside of a cup containing the expansible material. Thus, both of the aforesaid patents have attacked the problem of scorching the expansible material and overstroking the piston, but are still faced with the drawbacks of slow response time resulting from the heating element being positioned outside the cup containing the expansible material.

U.S. Pat. No. 4,685,651 to Nouvelle et al. discloses a thermostatic control device which, in one embodiment, includes a flat resistor printed on a flexible support positioned inside a capsule containing the expansible material, against the inner wall of the capsule. Electrical leads for the flat resistor extend out of the capsule through insulating rings of glass positioned in a plate welded to an end of the capsule.

SUMMARY OF THE INVENTION

By the present invention, an electrically actuated heat motor is provided which has a quick response time without encountering the previously associated problems of scorching the expansible material, damaging the electric heating element, overstroking the piston, or leaking expansible material around electrical leads extending to an electrical heating element through a cup containing the expansible material.

More specifically, the heat motor according to the present invention includes an electric heating element mounted in a substantially "floating" position in the expansible material within the cup so that no significant surface area of the electric heating element engages a wall of the heat motor, thereby providing quick heating of the expansible material while avoiding damage which could occur from forces exerted on the surfaces of the electric heating element by the expansion of the material when it is heated. In the floating position of the present invention, the forces of the expansion of the expansible material on every significant surface of the electric heating element are opposed by similar expansion forces of the expansible material on other surfaces. Copper particles can be included in the expansible material to further hasten heat transfer.

Electrical leads for the electric heating element extend from the cup through an electric insulator mounted in a bottom wall of the cup, the electric insulator being made of a material having the same thermal expansion coefficient as the bottom wall, in order to prevent leakage between the insulators and the bottom wall. The cup includes a side wall having an open bottom end, and the bottom wall is held in place on the side wall by rolling the bottom end of the side wall under the bottom wall as a flange, whereby the bottom wall compresses a seal interposed between the bottom wall and a shoulder in the side wall. By this arrangement, leakage of the expansible material from the cup is avoided.

The electrical leads extend through the electric insulator into the expansible material, and the ends of the leads in the expansible material are parallel to one another and spaced apart by a distance equal to the thickness of the electric heating element. The electric heating element includes an electric resistance element sandwiched between two plates of electrically conductive and thermally conductive material, and lugs are attached on the external surface of each plate and spaced apart by a distance equal to the diameter of the electrical leads so as to permit a plug-in connection between the electric heating element and a bottom wall assembly comprising an annular bottom wall, a plug of electric insulating material, and leads extending through the plug.

The plates have rounded bottom surfaces so that they can engage the plug of insulating material so as to define a limit for the insertion of the electrical leads between the lugs on the plates of the electrical heating element, the rounded surfaces allowing contact only along a line where the rounded surfaces are tangent to the plug of insulating material. The expansible material is present between the rounded edges and the plug on both sides of the tangent line, opposing forces on the top of the electric heating element tending to push the element into the plug.

In one embodiment, the electric resistance element is a thermistor having a positive temperature coefficient, which is self-limiting, so that no external regulator is needed to avoid the problems of scorching the expansible material and overstroking the piston. In another embodiment, the electric resistance element is a chip having a flat resistance element formed on two faces.

DETAILED DESCRIPTION OF THE PREFERRED EMBODIMENTS

Figure 1:
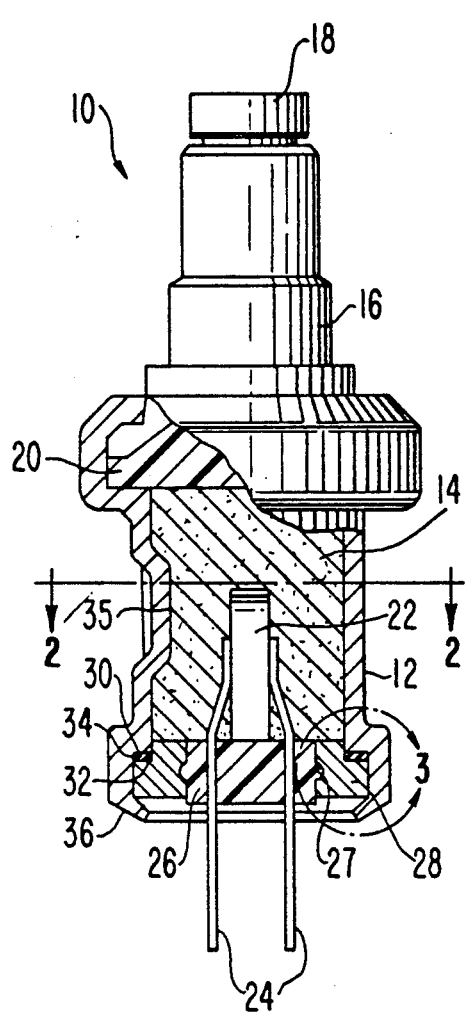
FIG. 1 is a front elevation, with parts in cross section, of the heat motor according to the present invention.
Figure 2:
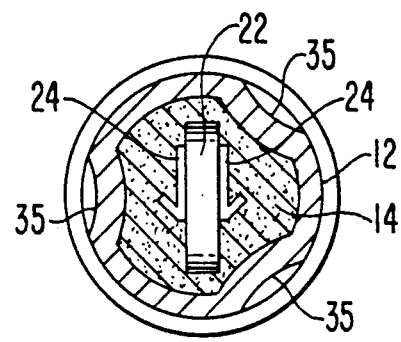
FIG. 2 is a cross section taken along the line 2—2 in FIG. 1.

As can be seen from FIGS. 1 and 2, the heat motor according to the present invention, which is designated generally by the reference numeral 10, includes a cup 12 of metal for holding a thermally expansible material 14, such as a wax, which expands as its temperature rises. The cup 12 is connected to a guide 16 for a piston 18, the exposed end of which is visible in FIG. 1. The other end of the piston 18 extends into the guide, where it engages a plug of elastomeric material 20 interposed between the inner end of the piston 18 and the expansible material 14 to transfer and amplify the expansion of the material 14 into reciprocation of the piston 18 out of the guide 16. The thermally expansible material 14 is preferably a wax containing a dispersion of particles of a heat conductive material, such as copper. A typical composition for the present invention is 65% copper particles and 35% wax. The expansible material 14 typically occupies a generally cylindrical volume having an axial dimension and a diameter. In order for the heat motor 10 to have the minimum response time, the axial dimension must be less than 1.5 times the diameter.

Heat is supplied to the expansible material 14 by a thermistor 22, which is positioned inside the cup 12 and in the expansible material 14. The thermistor 22 is in a substantially "floating" position with respect to the expansible material 14 and the cup 12, that is, no major surface of the thermistor engages a wall, either sidewall or end wall, of the cup 12. Instead, the expansible material 14 is interposed between all major surfaces of the thermistor 22 and any adjacent wall of the cup 12. As a result, the heating of the expansible material 14 does not cause the thermistor to be pushed against a wall of the cup by forces great enough to damage the thermistor 22. Instead, the forces tending to push the thermistor 22 against one wall are offset by forces exerted by the expansible material 14 on opposed major surfaces of the thermistor 22. The thermistor 22 of the embodiment of the present invention illustrated in the drawings has the shape of a disk, and the contacting by the edge of the disk only along a short line of tangency with a bottom wall of the cup does not result in forces pushing the thermistor 22 against the bottom wall with enough force to cause damage.

Electrical leads 24 extend from the thermistor 22 through a plug 26 of electrically insulating material, such as glass. The plug 26 is secured in an annular bottom wall 28 which has the same thermal coefficient of expansion as the plug 26 of insulating material so that no leakage takes places between the plug 26 and the bottom wall 28 as the temperature of the heat motor 10 changes. The plug 26 can be held in place in the bottom wall 28 by means of an annular bead 27 on the plug 26 mating with an annular groove on an inner circumference of the bottom wall 28. The projection of the electrical leads 34 through the bottom of the cup 12 allows the heat motor 10 to be side calibrated, or "bumped", without distorting the area of electrical connection. The heat motor 10 is calibrated by placing it in a hot liquid bath which heats the heat motor to the start-to-expand temperature of the thermally expansible material 14. Then, inward bumps 35 are formed in the side wall 12 until the thermally expansible material completely fills the chamber on the inside of the heat motor body. An indication of this point being reached is that the piston 18 just begins to move.

Figure 3:
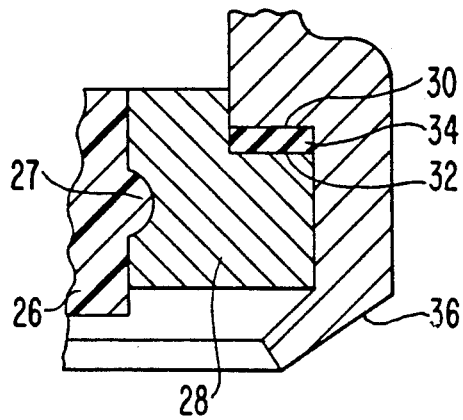
FIG. 3 is an enlarged cross section of a fragment of the heat motor of FIG. 1, showing the connection between a bottom wall and a side wall.

As can best be seen in FIG. 3, the cup 12 includes a radially outward extending shoulder 30, and the bottom wall 28 includes a shoulder 32 having dimensions corresponding to the dimensions of the shoulder 30. A gasket 34 of rubber or other elastomeric material is interposed between the shoulders 30 and 32, and the shoulders are moved towards one another, compressing the gasket 34, by forming crimps in the lower circumferential edge of the side wall 12 to define a generally radially inward directed flange 36 extending under the bottom wall 28.

The electrical leads 24 of the thermistor 22 are connected in an electrical circuit which is responsive to a predetermined condition, for example, the temperature of a space whose temperature is to be controlled rising to a predetermined level, to send a current through the thermistor 22 and thereby heat the expansible material 14 to cause the piston 18 to project from the guide 16. The piston 18 may engage or be connected to, for example, a valve, to open or close the valve to begin or stop the flow of a fluid to control the temperature of the space. A thermistor 22 having a positive temperature coefficient (PTC) is used, which means that when the temperature of the thermistor 22 increases, its resistance increases, and the amount of current which flows through the thermistor decreases. Since the current decreases, the amount of heating taking place in the thermistor 22 decreases. Thus, the thermistor 22 is self-limiting in that its temperature will not increase beyond a desired level. Thus, a thermistor 22 can be chosen which quickly heats to a temperature level desired for transferring heat to the thermally expansible material 14, but does not rise to a temperature great enough to scorch the expansible material and thereby change the thermal expansion characteristics of the expansible material. The self-limiting characteristic of the thermistor 22 also avoids overstroking of the piston 18 due to overheating and overexpansion of the expansible material 14. Such overstroking can damage components in the system to which the heat motor 10 is applied.

Figure 4:
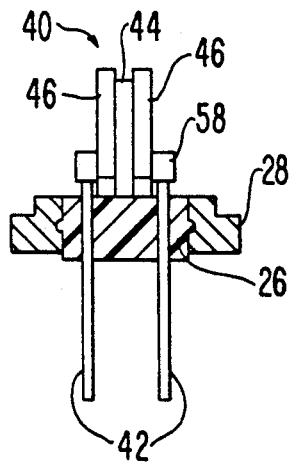
FIG. 4 is a front elevation of an alternate heating element assembly for the heat motor according to the present invention.
Figure 5:
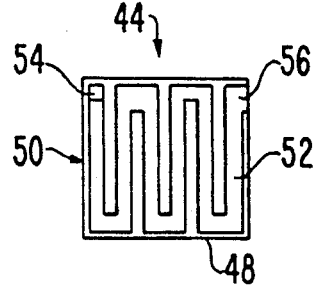
FIG. 5 is a top elevation of heating element assembly of FIG. 4.
Figure 6:
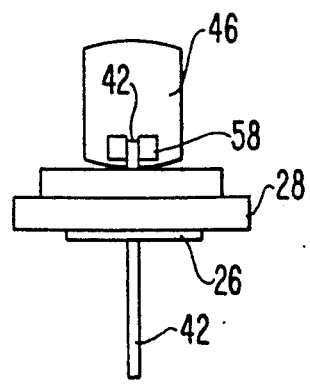
FIG. 6 is a side elevation of the heating element assembly of FIG. 4.

As can be seen from FIGS. 4-6, alternate forms of the heating element can be used in accordance with the present invention. FIG. 4 shows a heating element assembly 40 employing the bottom wall 28 and the glass plug 26 of insulating material which are also used in the embodiment illustrated in FIGS. 1-3. The bottom wall 28 can be secured to the side wall 12 of a heat motor 10 in the same way as shown in the embodiment of FIGS. 1-3. Straight parallel electrical leads 42 project from the top and bottom of the plug 26. An electrical heating element 44, such as a thermistor or a thin film resistor is sandwiched between two electrically conductive plates 46, which are also thermally conductive. The thin film resistor can be a ceramic chip 48 having a thin film 50 of iron oxide printed by conventional techniques, preferably on substantially the entire surface area of both faces to maximize heating surface area and, therefore, heat transfer area. The thin film 50 can define a single serpentine pattern extending across both sides of the ceramic chip 48, the thin film 50 having a major portion 52 of its surface area covered with an electrically insulating layer, such as a coating, and a small portion 54 of its surface area at one terminus of the serpentine pattern being uncoated so as to be in electrically conducting contact with one of the plates 46. The thin film 50 also includes a bridge portion 56 which extends from one side of the chip 48 around an edge of the chip 48 to the other side, where the serpentine pattern continues. On the other side, the heating element 44 has a similar major portion having an electrically insulating layer and a minor uncoated portion so as to make electrical contact with the other plate 46. Other forms of resistors can be used.

A pair of conductive lugs 58 is attached to the external face of each plate 46 by, for example, soldering near the end of the plate adjacent to the plug 26. The lugs 48 are spaced apart by a distance approximately equal to the outer diameter of the leads 42 so as to receive the leads 42 and permit a plug-in connection between the heating element, 44 and the plug 26. When a plug-in connection is made, the leads 42 can be soldered in place between the lugs 48.

As can best be seen from FIG. 6, the plates 46 are generally rectangular to maximize the area of heat transfer from the heating element 44 to the expansible material but have rounded surfaces at the top and bottom. The rounded bottom surface of each plate 46 defines with a top surface of the plug 26 a space in which the expansible material 14 can flow, so that the plates 46 contact the upper surface of the plug 26 only along a short line of tangency at the meeting of the plates 46 and the plug 26. The heating element 44 is spaced from the plug 26 so that it makes no contact therewith, and the space is filled with the expansible material 14. By the aforesaid construction, the pressure exerted on the heating element by the expansion of the expansible material 14 forcing the heating element against any wall of the heat motor 10 is minimal. Therefore, damage to the heat element by such forces is avoided.

It is further contemplated that modifications can be made to the preferred embodiments of the heat motor described herein without departing from the spirit and scope of the present invention, which is to be determined by the appended claims. For example, the plug-in connection of the embodiment of FIGS. 4 and 5 can be employed with the embodiment of FIGS. 1-3. In addition, the electrical heating element 44 of the embodiment of FIGS. 4 and 5 can be used without the plates 46, like the thermistor 22 of FIGS. 1 and 2. In that case, the electrical leads 24 are connected directly to the portions 54 of the thin film 50 which are uncoated with the electrically insulating layer.

I claim:

1. A heat motor comprising:
   a metal body defining a chamber having an open end, said body including a metal end wall, a metal side wall, and a flange on said side wall extending under said end wall;
   an element movable with respect to said body to perform an operation;
   a thermally expansible wax in said chamber, said expansible wax being expansible in response to an increase in its temperature to move said movable element;
   an electric heating element positioned in said chamber and within said thermally expansible wax, said thermally expansible wax being interposed between all significant surfaces of said heating element and said body;
   electrical leads extending from said electric heating element to a region outside said body of the heat motor; and
   electrical insulating material secured in said metal end wall of said body, said leads extending through said electrical insulating material, and said metal end wall having substantially the same coefficient of thermal expansion as the electrical insulating material, so that no leakage of said expansible material occurs between said end wall and the electrical insulating material as the temperature of the heat motor changes.

2. The heat motor according to claim 1, wherein said electric heating element comprises an electric resistance element and plates of electrically conductive material sandwiching said electric resistance element.

3. The heat motor according to claim 2, wherein said plates are made of a thermally conductive material.

4. The heat motor according, to claim 1, further comprising electrical leads for said electric heating element, and plug-in connection means between said electrical leads and said electric heating element.

5. The heat motor according to claim 1, wherein said electric heating element comprises a thermistor having a positive temperature coefficient.

6. The heat motor according to claim 2, wherein said electric resistance element has two sides and a thin film resistance material on both sides.

7. The heat motor according to claim 6, wherein the thin film resistance material extends substantially entirely across both sides of said electric resistance element.

8. The heat motor according to claim 1, wherein said movable element is a piston.

9. The heat motor according to claim 1, wherein said thermally expansible wax contains copper particles.

10. The heat motor according to claim 1, wherein the thermally expansible wax has an axial dimension and a diameter, and the axial dimension is less than 1.5 times the diameter.

11. The heat motor according to claim 2, wherein each said plate has a periphery including a curved portion, said curved portion contacting said body along a line of tangency.

12. The heat motor according to claim 11, wherein each said plate is substantially rectangular.

13. The heat motor according to claim 2, wherein said electric resistance element is spaced from said body.

14. The heat motor according to claim 11, wherein the electric resistance heating element is rectangular.

15. The heat motor according to claim 4, wherein each said electrical lead defines a diameter, and said connection means comprises pairs of lugs attached to said electric heating element, the lugs of each pair being spaced from one another by a distance substantially equal to the diameter of one of the leads, each said electrical lead positioned between the lugs of a pair.

16. The heat motor according to claim 1, wherein said side wall defines a shoulder, and a sealing ring is interposed between said bottom wall and said shoulder.

17. The heat motor according to claim 1, wherein said electric heating element has opposed, substantially planar major heat transfer surfaces.

* * * * *